United States Patent
Royalty

(10) Patent No.: US 10,756,428 B2
(45) Date of Patent: Aug. 25, 2020

(54) SYSTEMS AND METHODS FOR INERTIAL NAVIGATION SYSTEM TO RF LINE-OF SIGHT ALIGNMENT CALIBRATION

(71) Applicant: General Dynamics Mission Systems, Inc., Fairfax, VA (US)

(72) Inventor: James M. B. Royalty, Allen, TX (US)

(73) Assignee: General Dynamics Mission Systems, Inc., Fairfax, VA (US)

(*) Notice: Subject to any disclaimer, the term of this patent is extended or adjusted under 35 U.S.C. 154(b) by 428 days.

(21) Appl. No.: 15/492,228

(22) Filed: Apr. 20, 2017

(65) Prior Publication Data

US 2018/0233819 A1 Aug. 16, 2018

Related U.S. Application Data

(60) Provisional application No. 62/458,351, filed on Feb. 13, 2017.

(51) Int. Cl.
| | | |
|---|---|---|
| *H01Q 3/00* | (2006.01) | |
| *H01Q 3/08* | (2006.01) | |
| *H01Q 3/32* | (2006.01) | |
| *H01Q 3/34* | (2006.01) | |
| G01C 21/16 | (2006.01) | |
| G01S 19/24 | (2010.01) | |
| H01Q 1/32 | (2006.01) | |

(Continued)

(52) U.S. Cl.
CPC .............. *H01Q 3/08* (2013.01); *H01Q 3/32* (2013.01); *H01Q 3/34* (2013.01); *G01C 21/165* (2013.01); *G01S 19/24* (2013.01); *G01S 19/49* (2013.01); *H01Q 1/3216* (2013.01); *H01Q 3/267* (2013.01)

(58) Field of Classification Search
CPC .......... H01Q 3/2605; H01Q 3/36; H01Q 3/08; H01Q 3/14; H01Q 3/32; H01Q 3/34; H01Q 5/10; H01Q 5/22; H01Q 1/243; H04B 7/15507; H04B 7/0617
USPC .................................................. 342/372, 359
See application file for complete search history.

(56) References Cited

U.S. PATENT DOCUMENTS

| 5,202,695 A | * | 4/1993 | Hollandsworth | ........ H01Q 1/18 244/3.16 |
| 5,398,035 A | * | 3/1995 | Densmore | ............ H01Q 1/3275 343/713 |

(Continued)

FOREIGN PATENT DOCUMENTS

| EP | 1981120 A1 | 10/2008 |
| EP | 2587588 A1 | 5/2013 |
| EP | 2749892 A2 | 7/2014 |

*Primary Examiner* — Chuong P Nguyen
(74) *Attorney, Agent, or Firm* — LKGlobal | Lorenz & Kopf, LLP

(57) ABSTRACT

Systems and methods are provided for performing alignment calibration of an RF antenna in satellite communications. Data is received that is representative of inertial navigation system and gimbal angle measurement signals. The received data is collected while a vehicle is operated in a reduced yaw motion and while the RF antenna is tracking a satellite. Equations are used that describe a mathematical relationship among the misalignments, offsets, and latency mismatch to the antenna gimbal control servo measurements. Estimates are generated for certain errors involved in the alignment process. The generated estimates are provided for pointing the RF antenna.

20 Claims, 9 Drawing Sheets

(51) Int. Cl.
*H01Q 3/26* (2006.01)
*G01S 19/49* (2010.01)

(56) References Cited

U.S. PATENT DOCUMENTS

| | | | | |
|---|---|---|---|---|
| 5,557,285 A | * | 9/1996 | Bender | B64G 1/22 |
| | | | | 342/358 |
| 5,854,609 A | * | 12/1998 | Pyo | G01S 3/325 |
| | | | | 342/359 |
| 6,002,364 A | * | 12/1999 | Kroeger | H01Q 1/1257 |
| | | | | 342/359 |
| 6,122,595 A | * | 9/2000 | Varley | G01S 19/47 |
| | | | | 342/357.59 |
| 6,538,602 B2 | * | 3/2003 | Natsume | H01Q 1/125 |
| | | | | 342/359 |
| 6,859,185 B2 | * | 2/2005 | Royalty | H01Q 3/08 |
| | | | | 343/757 |
| 7,009,558 B1 | * | 3/2006 | Fall | G01S 19/47 |
| | | | | 342/359 |
| 7,333,064 B1 | * | 2/2008 | Timothy | H01Q 1/125 |
| | | | | 343/705 |
| 7,522,102 B2 | * | 4/2009 | Shi | H01Q 1/28 |
| | | | | 342/354 |
| 7,528,773 B2 | * | 5/2009 | Fall | G01S 3/42 |
| | | | | 342/359 |
| 7,693,659 B2 | * | 4/2010 | Zimmerman | G01C 21/165 |
| | | | | 340/988 |
| 9,297,893 B2 | * | 3/2016 | Granet | G01S 13/4409 |
| 9,774,097 B2 | * | 9/2017 | Clymer | H01Q 1/185 |
| 10,277,308 B1 | * | 4/2019 | Cross | H04B 7/18508 |
| 10,355,351 B2 | * | 7/2019 | Cummings | H04B 7/0617 |
| 2005/0004748 A1 | * | 1/2005 | Pinto | G01C 21/165 |
| | | | | 701/470 |
| 2009/0289850 A1 | * | 11/2009 | Liu | H01Q 1/185 |
| | | | | 342/359 |
| 2011/0133982 A1 | | 6/2011 | Goshen et al. | |
| 2015/0200449 A1 | * | 7/2015 | Sleight | H01Q 1/28 |
| | | | | 342/352 |
| 2017/0254903 A1 | * | 9/2017 | Johnson | H01Q 1/1257 |
| 2019/0013566 A1 | * | 1/2019 | Merrell | H01Q 1/1257 |
| 2019/0064364 A1 | * | 2/2019 | Boysel | G01S 17/933 |

* cited by examiner

← 600

$\overline{\psi}_{error} = \psi_{offset} + \Delta Pitch \sin(\overline{\psi}_{tgt} - \overline{\psi}_{veh}) \tan(\overline{\theta}_{tgt}) + \Delta Roll \cos(\overline{\psi}_{tgt} - \overline{\psi}_{veh}) \tan(\overline{\theta}_{tgt}) - \lambda(AzCmd - AzCmdold)/Ts$ $\overline{\theta}_{error} = \overline{\theta}_{offset} + \Delta Pitch \cos(\overline{\psi}_{tgt} - \overline{\psi}_{veh}) + \Delta Roll \sin(\overline{\psi}_{tgt} - \overline{\psi}_{veh}) - \lambda(ElCmd - ElCmdold)/Ts$

$\begin{bmatrix} 1 & 0 & \sin(\overline{\psi}_{tgt} - \overline{\psi}_{veh})\tan(\overline{\theta}_{tgt}) & \cos(\overline{\psi}_{tgt} - \overline{\psi}_{veh})\tan(\overline{\theta}_{tgt}) & -(AzCmd - AzCmdold)/Ts \\ 0 & 1 & \cos(\overline{\psi}_{tgt} - \overline{\psi}_{veh}) & \sin(\overline{\psi}_{tgt} - \overline{\psi}_{veh}) & -(ElCmd - ElCmdold)/Ts \end{bmatrix} \begin{Bmatrix} \psi_{offset} \\ \theta_{offset} \\ \Delta Pitch \\ \Delta Roll \\ \lambda \end{Bmatrix} = \begin{matrix} \overline{\psi}_{error} \\ \overline{\theta}_{error} \end{matrix}$

FIG. 8

$$\begin{bmatrix} \text{First Measurement} \to & 1 & 0 & \sin(\overline{\psi}_{tgt1} - \overline{\psi}_{veh1})\tan(\overline{\theta}_{tgt1}) & \cos(\overline{\psi}_{tgt1} - \overline{\psi}_{veh1}) & -(AzCmd - AzCmdold)/Ts \\ & 0 & 1 & \cos(\overline{\psi}_{tgt1} - \overline{\psi}_{veh1}) & \sin(\overline{\psi}_{tgt1} - \overline{\psi}_{veh1}) & -(ElCmd - ElCmdold)/Ts \\ \text{Second Measurement} \to & 1 & 0 & \sin(\overline{\psi}_{tgt2} - \overline{\psi}_{veh2})\tan(\overline{\theta}_{tgt2}) & \cos(\overline{\psi}_{tgt2} - \overline{\psi}_{veh2}) & -(AzCmd - AzCmdold)/Ts \\ & 0 & 1 & \cos(\overline{\psi}_{tgt2} - \overline{\psi}_{veh2}) & \sin(\overline{\psi}_{tgt2} - \overline{\psi}_{veh2}) & -(ElCmd - ElCmdold)/Ts \\ \text{Third Measurement} \to & 1 & 0 & \sin(\overline{\psi}_{tgt3} - \overline{\psi}_{veh3})\tan(\overline{\theta}_{tgt3}) & \cos(\overline{\psi}_{tgt3} - \overline{\psi}_{veh3}) & -(AzCmd - AzCmdold)/Ts \\ & 0 & 1 & \cos(\overline{\psi}_{tgt3} - \overline{\psi}_{veh3}) & \sin(\overline{\psi}_{tgt3} - \overline{\psi}_{veh3}) & -(ElCmd - ElCmdold)/Ts \\ & & & \cdots & & \end{bmatrix} \begin{Bmatrix} \psi_{offset} \\ \theta_{offset} \\ \Delta Pitch \\ \Delta Roll \\ \lambda \end{Bmatrix} = \begin{Bmatrix} \psi_{error1} \\ \theta_{error1} \\ \psi_{error2} \\ \theta_{error2} \\ \psi_{error3} \\ \theta_{error3} \\ \cdots \end{Bmatrix}_{meas}$$

SYSTEMS AND METHODS FOR INERTIAL NAVIGATION SYSTEM TO RF LINE-OF SIGHT ALIGNMENT CALIBRATION

CROSS-REFERENCE TO RELATED APPLICATION

This application claims the benefit of U.S. Provisional Application No. 62/458,351 filed Feb. 13, 2017 which is incorporated herein by reference in its entirety.

TECHNICAL FIELD

The technical field generally relates to radio frequency (RF) antenna communication with satellites, and more particularly relates to antenna pointing and pointing alignment calibration.

BACKGROUND

Antenna systems undergo alignment for better tracking of satellites. Antenna calibration provides for alignment of the signal with the peak level of the main beam of the tracking antenna. This allows for such benefits as maximum antenna gain. Errors in the measurements of antenna pointing, however, can create difficulties in the alignment calibration process.

More specifically, on-the-move ground, air, and marine satellite communication terminals can require highly accurate RF open loop (no tracking) line-of-sight (LOS) pointing during transmit and receive communications. This accuracy maintains a reliable link between the antenna and satellite by keeping the signal gain high and keeps the antenna terminal from corrupting adjacent satellites' communication operating in the same frequency band. However, errors in the antenna servo system such misalignment between the vehicle's inertial navigation system (INS) and the antenna can degrade the pointing accuracy.

These errors arise in such systems as Satellite communications on the move (Satcom-on-the-move). Satcom-on-the-move involves a vehicle equipped with a satellite antenna for establishing communication with a satellite and maintaining that communication while the vehicle is moving. The Satcom-on-the-move antenna application needs accurate pointing, typically without the help of tracking the satellite signal. Typically, antenna systems undergo pointing calibrations to mitigate the misalignment and other errors for more accurate pointing. These calibrations can be costly from a time, material, and labor standpoint. The systems and methods described herein can significantly reduce the cost of this alignment for large ships and aircraft but also applies to smaller craft and ground mobile antennas systems. In addition, the antenna system can utilize the host vehicle's INS instead of requiring the host to provide an additional INS.

SUMMARY

In accordance with the teachings provided herein, systems, methods, apparatuses, non-transitory computer-readable medium for operation upon data processing devices are provided for performing alignment calibration of an RF antenna in satellite communications. For example, a system is provided for performing alignment calibration of an RF antenna in satellite communications. Data is received that is representative of inertial navigation system and gimbal angle measurement signals. The received data is collected while a vehicle is operated in a reduced yaw motion and while the RF antenna is tracking a satellite. Equations are used that describe a mathematical relationship among the misalignments, offsets, and latency mismatch to the antenna gimbal control servo measurements. Estimates are generated for certain errors involved in the alignment process. The generated estimates are provided for pointing the RF antenna.

As another example, a system operating upon one or more data processors receives data representative of inertial navigation system and gimbal angle measurement signals. The received data is collected while a vehicle is operated in a reduced yaw motion and while the RF antenna is tracking a satellite. Equations are used that describe a mathematical relationship among the misalignments, offsets, and latency mismatch to the antenna gimbal control servo measurements. Estimates are generated of the alignment angle errors among the inertial navigation system and the antenna gimbal base, antenna gimbal angle measurement offsets, and latency mismatch between the gimbal angle command path and the gimbal angle measurement path. The generated estimates are provided for pointing the RF antenna.

DESCRIPTION OF THE DRAWINGS

FIGS. 7-9 provide an example of mathematical equations and matrix operations for alignment calibration.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
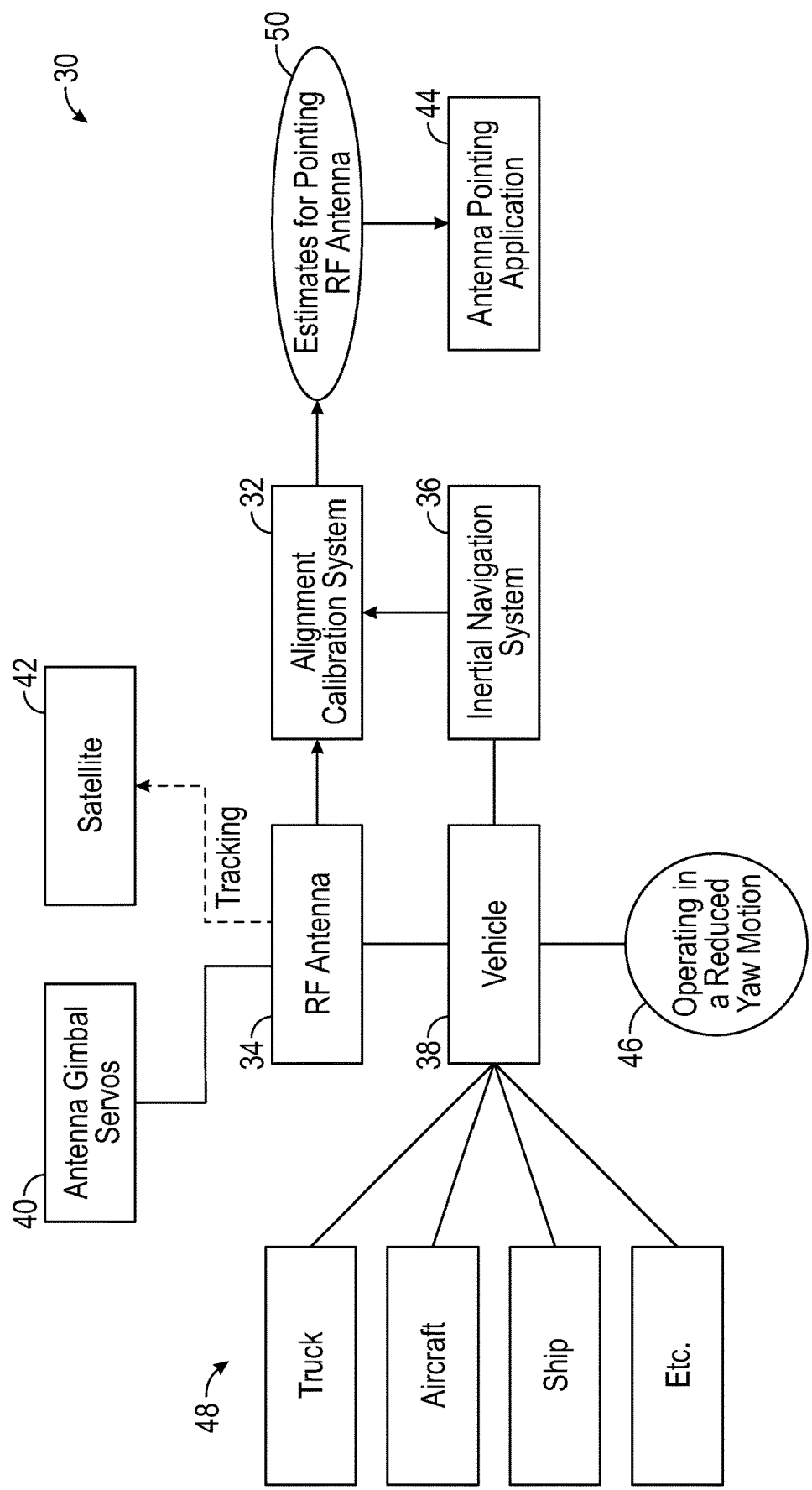
FIGS. 1-3 are block diagrams depicting an antenna alignment calibration in accordance with certain example embodiments.

FIG. 1 depicts at 30 a system 32 for alignment calibration of an RF antenna 34 in satellite communications, including those involving satellite communications on the move. Satcom-on-the-move products use an inertial navigation system 36 (INS) mounted on a vehicle 38 and servo controlled gimbals 40 to point antenna line-of-sight (LOS) at a satellite 42.

A Satcom-on-the-move antenna pointing application 44 needs accurate pointing, without the help of tracking the satellite signal, e.g., open loop pointing, during two-way communication. To help with antenna pointing, the calibration system 32 receives inertial navigation system data and gimbal angle measurements related to the antenna's gimbal servos 40.

The calibration system 32 performs the calibration while the RF antenna is tracking a satellite (receive only) and while the vehicle 38 is operated in a reduced yaw motion 46. The vehicle 38 undergoes a yaw motion in order to generate sufficient data for the calibration process. The alignment calibration can be performed with non-planar vehicle motion. With the system 32 performing alignment calibration with reduced vehicle yaw motion, vehicles 48 (e.g., ships, aircraft, etc.) do not have to complete multiple revolutions. This saves time and money (e.g., labor, material, etc.). Still further, the system 32 can utilize the host vehicle's INS 36, thereby reducing system cost.

Based on this data, the calibration system 32 generates estimates 50 of the alignment angle errors among the inertial navigation system 36 and the antenna gimbal base, antenna gimbal angle measurement offsets, and latency mismatch between the gimbal angle command path utilizing the INS measurement and the gimbal angle measurement path. The generated estimates 50 are provided to the antenna pointing application 44 for pointing the RF antenna 34. The system's alignment calibration can be used during antenna install or periodic calibration.

The calibration system 32 accounts for mechanical misalignments between INS 36 and the antenna gimbal base, offsets in the azimuth and elevation gimbal resolver measurements from the RF LOS orientation, and difference in process latency between the INS path and gimbal angle measurement path. These items directly degrade antenna pointing performance. Without being addressed, dominant errors may arise in this process because of the misalignments, offsets, and process latency mismatch.

Figure 2:
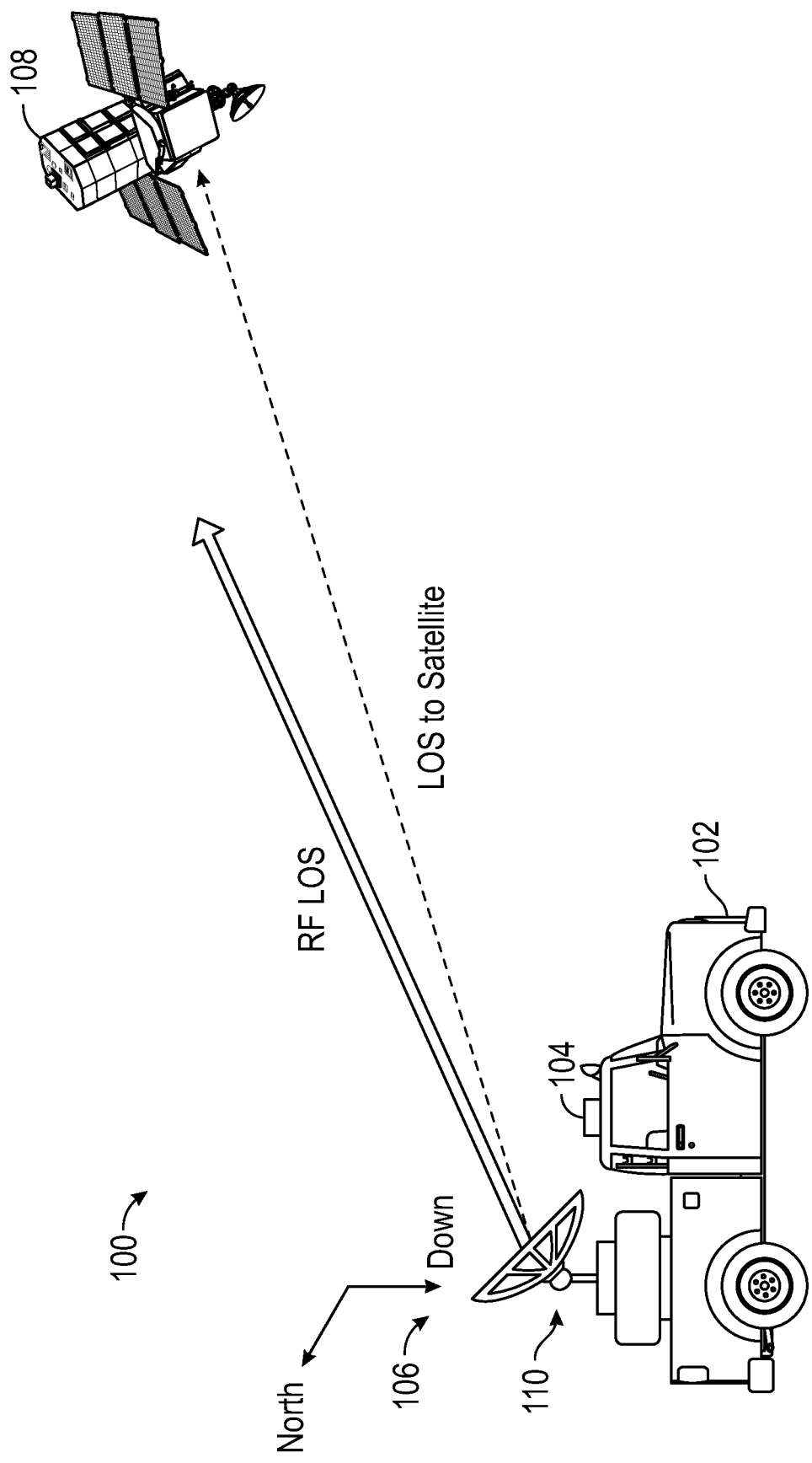

FIG. 2 depicts at 100 components involved in an alignment calibration process. A vehicle 102 hosts an INS 104 and an antenna 106. More specifically, the INS 104 provides vehicle 102 heading angle to North and pitch and roll angles to level. The vehicle's INS 104 uses a coordinate system based on latitude, longitude, and altitude of the vehicle's reference point, plus the orientation of the vehicle 102 (roll, pitch, and heading).

The alignment calibration process helps to align the antenna 106 with respect to the satellite 108. The angular orientation of the antenna 106 (usually the centerline of a parabolic dish reflector) is called the Line-of-Sight (LOS) of the antenna 106. The antenna LOS is the direction of maximum transmitted and received RF energy. Before calibration, the RF LOS may not be aligned with the actual LOS to the satellite 108. The antenna azimuth and elevation gimbals with resolvers 110 (for sending measurements of the actual pointing direction of the antenna), in the vehicle frame, determine the antenna coordinate system. More specifically, the resolvers 110 provide gimbal angle measurements relative to the vehicle 102.

Figure 3:
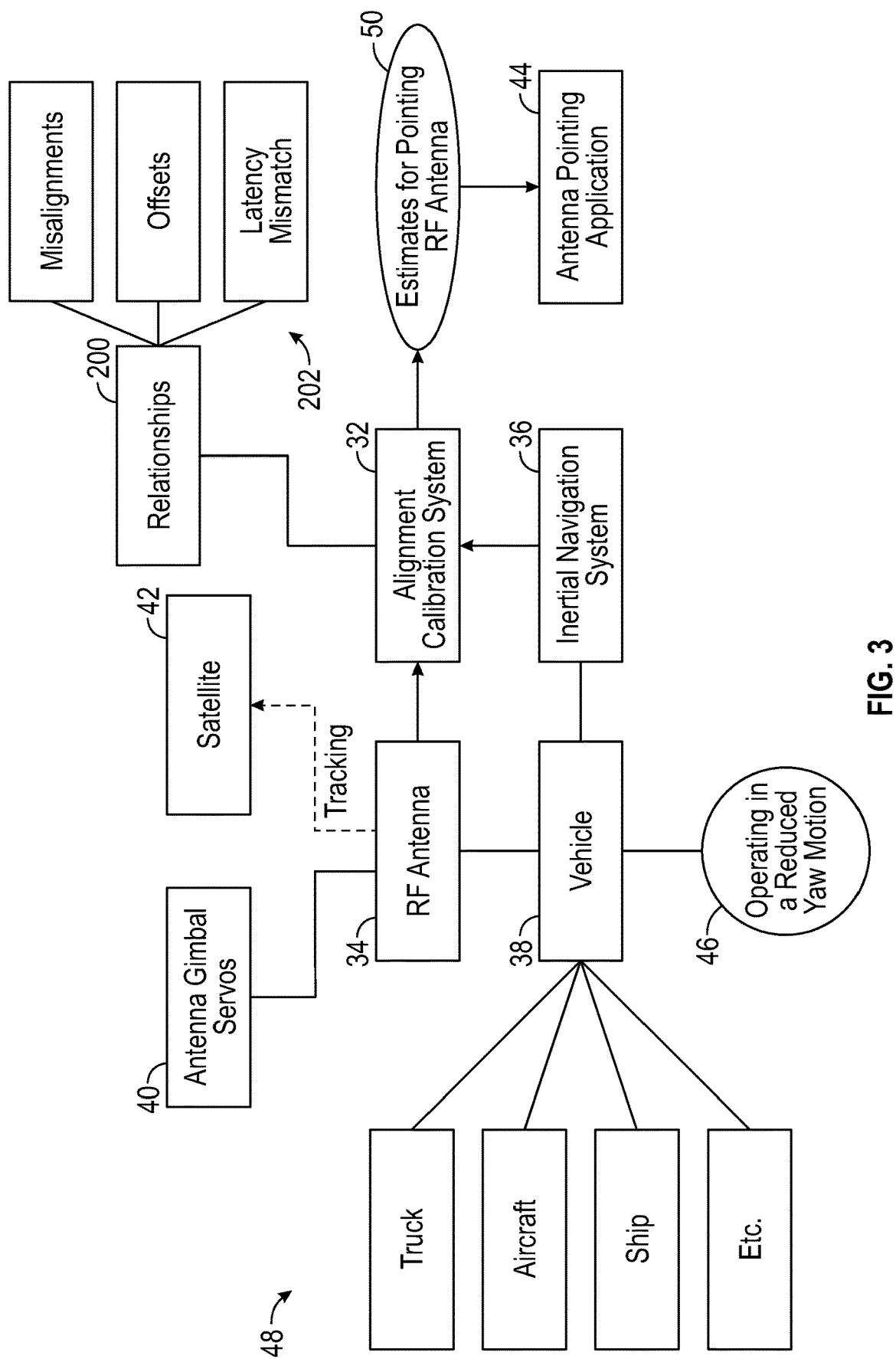

FIG. 3 depicts the alignment calibration system 32 processing input data by using mathematical equations that describe relationships 200 among the misalignments, offsets, and latency mismatch to the available antenna gimbal control servo measurements as shown at 202. The resulting relationships 200 provide two equations but with five unknowns. To address the undetermined solution the process acquires measurements over an adequate yaw excursion to obtain sufficient independence for a least squares solution. The iterative least squares solution is configured in this example as follows: perform a first pass of the calibration algorithm; and while the vehicle continues to yaw sinusoidally, utilize the results of the first pass to enhance the second pass results, etc. This enhances the ability during high uplook angles with the outer azimuth/inner elevation gimbal configuration to converge to accurate estimates. Note that for an x-y or roll-pitch gimbal, the high uplook may not be an issue but may be an issue be for elevation angles near the horizon (high latitudes), and this complication can be resolved by multiple iterations. Track mode (e.g., tracking the satellite RF signal) is used for this process for providing an angularly stationary antenna LOS under a moving vehicle.

Results include estimates of the two alignment angle errors between the inertial navigation system (INS) and the antenna gimbal base, two antenna gimbal angle measurement offsets, and the latency mismatch between the gimbal angle command path and the gimbal angle measurement path. These values are then used in the open loop pointing solution. This approach results in a significantly reduced vehicle yaw motion to obtain these unknown parameters which can cause significant open loop pointing errors. This approach allows for moderate vehicle roll and pitch motion during the calibration. These two items allow airborne and maritime (e.g., small and large craft) applications for Satcom on-the-move with much less labor, material, and time during an install.

Figure 4:
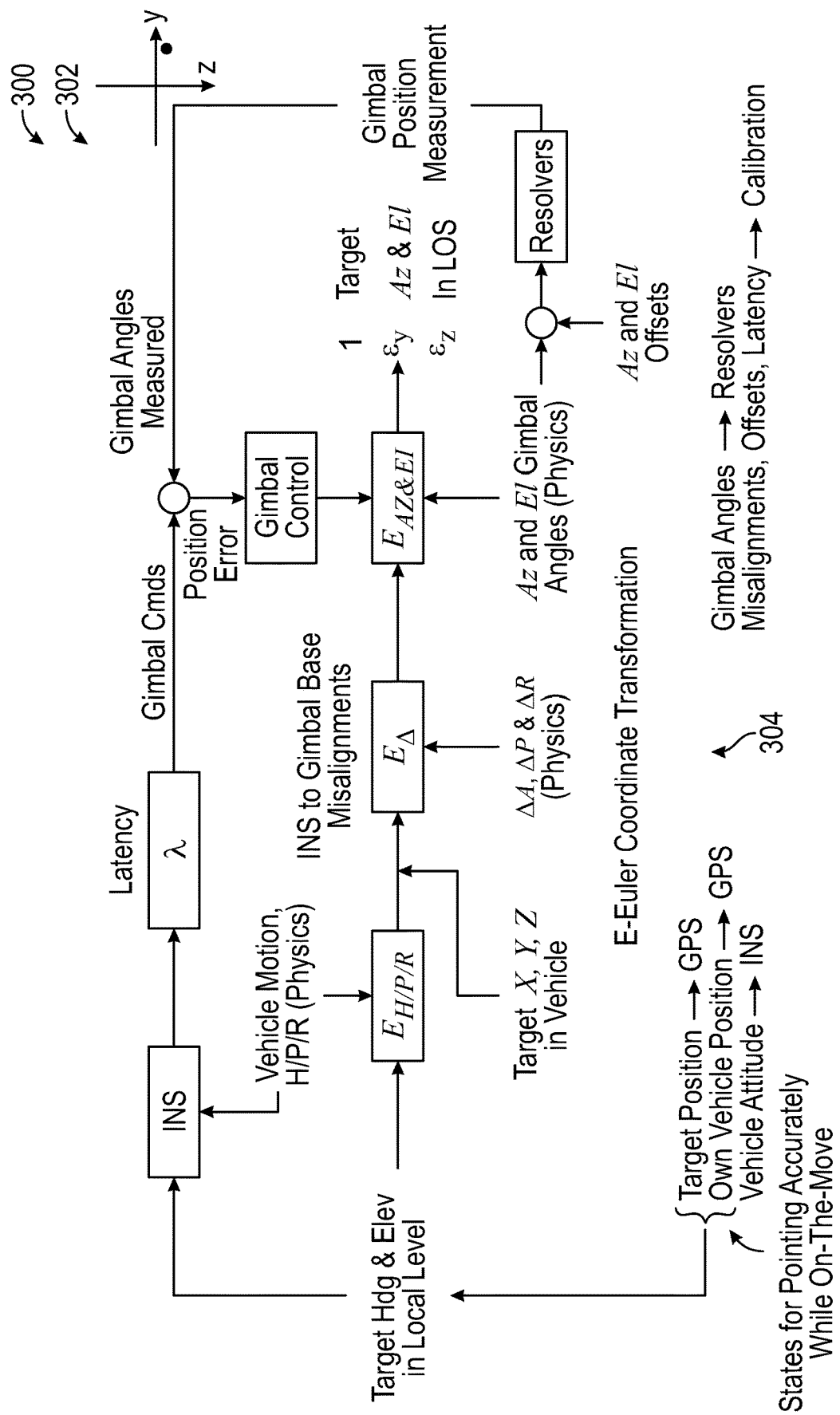
FIG. 4 is a flow diagram depicting open loop RF antenna pointing physics.

FIG. 4 shows an alignment calibration process for open loop pointing utilizing the INS to measure the vehicle orientation to North, pitch and roll angles to level. The physical gimbal angles are determined as shown at 302 by the difference of the gimbal angle commands and the gimbal angles measured and the error associated with the angle measurement. The flow 304 through the middle of the diagram is the physics of the satellite (or "target") position projected, normalized by range, into the antenna's RF LOS coordinates as [1 cy cz]'. The second and third elements in the vector represent the pointing errors along the y (yaw or azimuth) and along the z (pitch or elevation) axes in the antenna's RF LOS frame, which leads to satellite communication gain loss and to radiating the neighboring satellite operating at the same frequency.

The INS does not recognize the misalignments between itself and the gimbal base. The gimbal resolvers (angle measurement) do not know their offset from the RF LOS angles relative to the gimbal base. The processor does not know the differential latency between the gimbal angle command and gimbal angle measurement paths.

Figure 5:
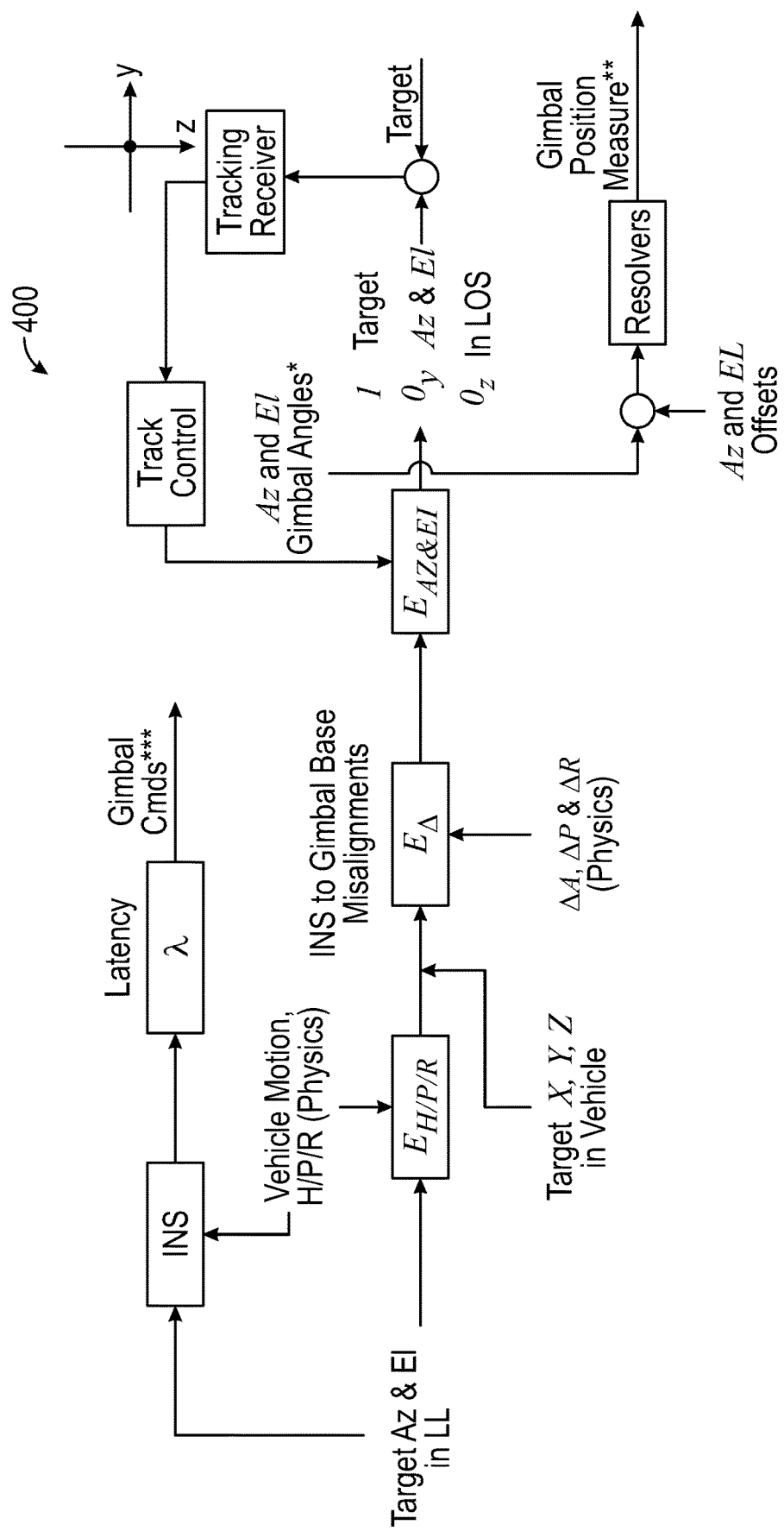
FIG. 5 is a flow diagram depicting RF antenna track control pointing physics.

FIG. 5 illustrates at 400 that while tracking, the error vector at the LOS is forced to [1 0 0]' by the track control servo loop utilizing the satellite's RF signal and the tracking receiver as feedback to drive the gimbals to necessary angles to maintain the accurate pointing. Tracking of the satellite signal is a receive-only process and is allowed during this calibration. But during two-way communications, requirements specify no tracking because of the larger pointing error while tracking, therefore pointing the antenna LOS as the satellite must be conducted in an open loop (no RF signal feedback) fashion.

During calibration while tracking the satellite signal, the gimbal angles are set to maintain the RF LOS on the satellite while tracking independent of the INS (gimbal command) and the gimbal angle measurements. The difference between the gimbal command and gimbal angle measurements while tracking represent the inaccuracy of the open loop pointing control since these two measurements are used to control the RF LOS position as can be seen in FIG. 5. With this understanding the equations that make up the difference between the gimbal commands (INS path) and the gimbal measurements while tracking can be developed.

The satellite ("target") azimuth (heading to North) and elevation angles are redescribed as a vector, [x y z]' in the local level reference frame. This satellite vector, transformed by the vehicle orientation to North and level, is now described in the vehicle reference frame (forward –x, starboard –y, and down –z). This vector is converted to azimuth and elevation commands by the $\arctan(y/z)$ and $\arctan(-z/\sqrt{x^2+y^2})$, respectively. This initial process is included in the software and in the analysis model used for verifying the algorithm. These commands have no knowledge of the INS to gimbal base misalignments.

The satellite vector in vehicle coordinates is transformed with unknown (unknown to software but known to the analysis for estimate error reporting) INS to gimbal base misalignments and whatever gimbal position angles necessary to maintain the satellite vector in the antenna's RF LOS frame to be [1 0 0]'. Offsets are added to the azimuth and elevation gimbal position measurement. In some situations, the yaw INS to gimbal base misalignment and the azimuth gimbal measurement offset are added to form one error and placed in the prior INS misalignment transformation during the analysis.

The equations of the gimbal commands and the gimbal angles which involve the gimbal commands, the misalignments and the gimbal angle measurements are differenced to produce extensive equations. These equations relate the error measurements to the misalignment and offset errors.

Figure 6:
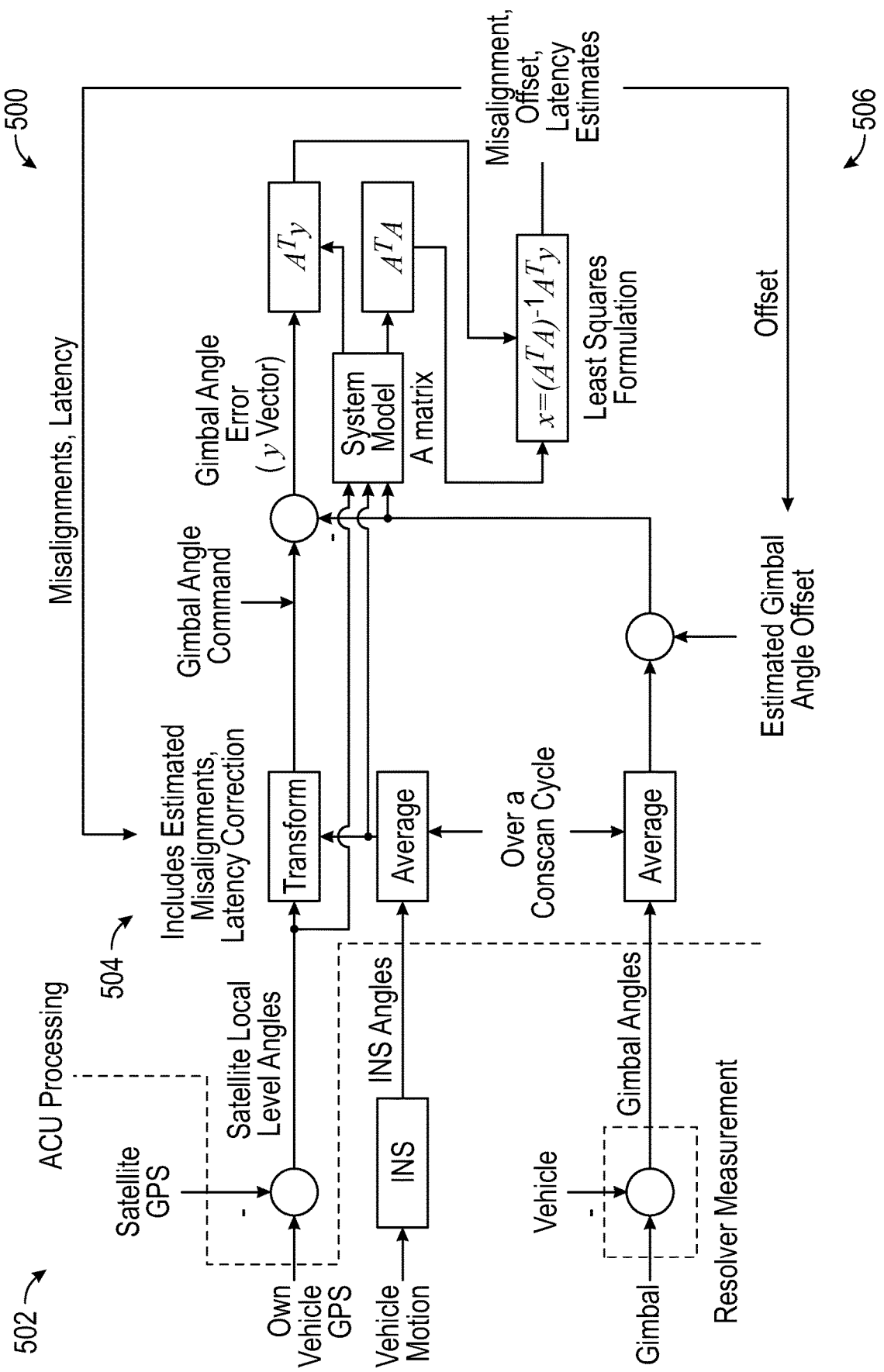
FIG. 6 depicts a calibration processing flow diagram.

FIG. 6 depicts at 500 a calibration processing flow diagram. As shown at 502 in the figure, input from the vehicle GPS, satellite GPS, INS, and resolvers are acquired. The INS angles and gimbal angles are averaged. As shown at 504, the average INS angles and satellite local level angles are provided to a transformation process which also takes into account misalignments and latency. As shown at 506, matrix operations are performed when creating the system model so that a least squares formulation can calculate estimates for misalignment, offset, and latency. FIGS. 7 and 8 provide an example of mathematical equations and matrix operations for alignment calibration.

FIG. 7 depicts at 600 two equations showing the azimuth and elevation errors where the terms in red font are the unknown misalignments (delta Pitch and delta Roll and the gimbal measurement offsets). Delta Azimuth misalignment has been added to the azimuth gimbal offset for ease of equation formulation without loss of accuracy. The Greek letters with a bar over them are the measurements. The left hand side of the equations is the position error: gimbal command minus gimbal angle measurement.

The two equations of FIG. 7 can be transformed into state space as shown at 700 in FIG. 8. The state space equations can be represented in matrix or linear algebra form as shown in FIG. 8 where the top row of the matrix multiplies the vector, element by element, and sums to be equal to the right side. These two equations can be represented by Ax=y, where "A" is the matrix of coefficients, "x" contains the unknowns we are estimating, and the "y" vector are the error measurements As shown at 800 in FIG. 9, as more measurements (i.e., first measurement, second measurement, third measurement, etc.) are taken, the measurements are appended to the A matrix and to the y vector. The 1st column of the A matrix will alternate 1 and 0, the 2nd column alternates 0 and 1, and the 3rd, 4th, and 5th columns repeat themselves with sequential measurement formulations two rows at a time. Then the A matrix will be 2*N number of rows by five (number of error terms estimated) columns wide. And the y vector will 2*N number of rows, where N is the number of measurements. When including the vehicle pitch and roll inputs in the full algorithm, the A matrix changes but x and y vectors stay the same.

Typically in linear algebra to solve for x, both sides of the equation would be multiplied by A−1, if A is invertible. But since A is not square (unequal number of rows and columns), it is not invertible. We first multiply both sides by A transpose, At, which produces a square matrix. Then multiply both sides by the inverse, (AtA)−1, which allows x to be solved, x=(AtA)−1At y, which is computed real time on a low sample rate basis. AtA is a 5 row by 5 column matrix which is dependent on the number of unknown terms being estimated and not dependent on the number of measurements. In addition, the At y product stays a 5 row by 1 column vector no matter the number of measurements. So rather than maintaining A and y which continue to grow with each measurement, we maintain (AtA)−1 and At y which remain the same size throughout the measurement process.

As an example, the solution can include a formulation for the best estimate of the unknowns, x. This is termed a least squares formulation. This equation creates valid results when there is sufficient vehicle yaw displacement. Otherwise, nearly the same equation will continue to populate the A matrix, and no new information is added so the resulting two equation with five unknowns situation effectively still exists.

Figure 10:
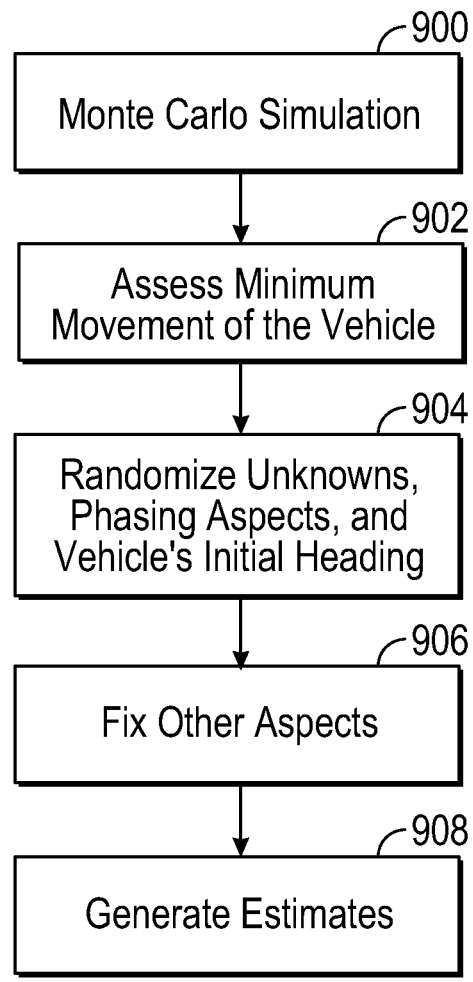
FIG. 10 is a flowchart depicting a simulation for antenna alignment calibration.

As shown in FIG. 10, a Monte Carlo simulation 900 can be used to determine the necessary minimum vehicle movement and maximum elevation satellite angles to provide adequate estimate errors for a particular 2-axis gimbal configuration as shown at 902. At 904, four of the five unknowns were randomized to be uniformly distributed within the manufacturing requirements. At 906, the latency was fixed as would be expected between same models produced. The vehicle yaw, pitch, and roll amplitudes and frequencies were fixed but their phasing relative to each other was randomized. The vehicle's initial heading was randomized relative to the satellite heading. The elevation angle to the satellite was fixed at various elevation angles to understand that dependency.

The algorithm runs while the vehicle is moving and conducting yaw cyclic maneuvers between ±10 and ±45 degrees. While the vehicle continues to move the algorithm runs a 2nd time using the results from the 1st pass to enhance the 2nd pass result. This is repeated until the azimuth and elevation gimbal errors (angle command−angle measurement) are below a threshold during a pass. The threshold is set dependent on the system pointing error budget allowance which ranges from 0.02 to 0.15 degrees depending on application requirements. This threshold is typically met between 3 and 6 passes. Each pass is time fixed at 10 (TBR) seconds. Data is collected at the position loop sample rate. Every 0.1 (TBR) second, the algorithm is processed once for an estimate of the unknown parameters. So each pass will have 10/(0.1) or 100 measurements to create the estimates at 908 for the misalignment error, the measurement offset, and process latency.

An example can include uplook angles of 75 degrees (worst case uplook near equator) to the satellite with 5 degrees of pitch and roll vehicle motion and only ±15 degrees of vehicle yaw motion. The algorithm estimates the misalignment, offset, and latency such that the command angle minus gimbal angle errors for a full vehicle yaw revolution is less than 0.015 degrees error in 3 to 7 passes (each pass takes 10 seconds.)

With the uplook to the satellite at 49 degrees, the position error continues to be less than 0.015 degrees for a full revolution with just 3 and 4 passes. With uplook to the satellite at 63 degrees, the number of passes are between 3 and 5. The algorithm takes between 3 and 8 passes when the vehicle pitch and roll are increased to 15 degrees.

The parameter estimates are formulated over a limited vehicle yaw motion. So the analysis calculates the pointing error while the vehicle traverses 360 degrees of yaw motion to verify the algorithm continues to be accurate over any vehicle yaw angle excursion. The peak error is typically significantly less than 0.03 degrees which is allocated by a 0.2 degree total pointing error budget. This error limit is set by the threshold in the algorithm. If less accuracy is needed, less iterations are required and less time.

While at least one example embodiment has been presented in the foregoing detailed description, it should be appreciated that a vast number of variations exist. It should also be appreciated that the embodiment or embodiments are only examples, and are not intended to limit the scope, applicability, or configuration of the disclosure in any way. Rather, the foregoing detailed description will provide those of ordinary skill in the art with a convenient road map for implementing the example embodiment or embodiments. It should be understood that various changes can be made in the function and arrangement of elements without departing from the scope of the disclosure as set forth in the appended claims and the legal equivalents thereof. As an example of the wide variations of the systems and methods described herein, a system can be configured to operate with serpentine vehicle motion even with moderate vehicle pitch and roll, target elevation up to 75 degrees, and outer azimuth/inner elevation gimbal configuration. The system benefits such environments as marine vessels and aircraft applications which take considerable more time, material, and labor to perform calibration than on trucks, though still applicable to ground vehicles.

As an illustration, a system can be configured to perform a calibration that needs between 10 to 45 degrees of vehicle yaw motion. As mentioned above, this is a benefit for maritime and airborne applications for reducing time, labor, and material costs. The system can allow up to at least 15 degrees of roll and pitch at lower satellite elevation angles (up to 65 degrees) and up to 5 degrees for satellites near 75 degrees for the outer azimuth/inner elevation gimbal configuration. In contrast, previous alignment calibration systems, conducted during vehicle install and periodically, forces the vehicle, on which the Satcom-on-the-Move antenna is mounted, to complete up to two yaw revolutions. Additionally, such previous systems require close to horizontal plane yaw movement. In other words, such alignment processes require 1-2 complete yaw revolutions of the vehicle and almost a planar motion to be accurate, and for the vehicle to be stationary for the other error estimate.

Current approaches can also involve intensive operations, such as the following two step process. The first step involves IMU Alignment with elevation offset and INS to gimbal base delta pitch and roll processing. More specifically for the first step, the vehicle is driven in a circle in a parking lot while tracking satellite signal. The El Gimbal Command state is compared to elevation resolver. The El Gimbal Command derived from Satellite az and el in local level is converted to X, Y, Z vector, transformed to vehicle frame by INS heading, pitch, and roll, and a tan 2 function. Error between Command and resolver is processed. For the offset, an average of the error over 360 degrees of vehicle travel is obtained. The INS to Gimbal Base misalignment in Pitch is demodulated by the cosine(INS heading-vehicle heading) and averaged over 360 degrees of vehicle yaw travel. The INS to Gimbal Base misalignment in Roll is demodulated by the sine(INS heading+vehicle heading) and averaged over 360 degrees of vehicle yaw travel. The offset is applied to resolver measurement with the delta pitch and roll being incorporated into a revised gimbal command development.

The second step involves IMU alignment with azimuth offset. More specifically for the second step, while the vehicle is stationary, the gimbals are commanded to point RF LOS at Satellite and record average azimuth resolver angle. The mode is changed to track (RF LOS peaks up on Satellite's signal) and again record average azimuth resolver angle. The azimuth angles are subtracted and applied to azimuth resolver measurement as an offset.

The system can be configured with operations described herein to replace operations such as steps 1 and 2 and others. This results in more efficient processing, such as by reducing the amount of vehicle yaw motion so vehicles (e.g., ships, aircraft, trucks, etc.) do not have to complete multiple revolutions, thereby saving time and money (e.g., labor and material). The process also applies during antenna install or periodic calibration.

As another example of the wide variations of the systems and methods disclosed herein, the systems and methods can include for an outer azimuth/inner elevation gimbal configuration and for high LOS elevation angles, such as above 70 degrees (near equator operations), there is a trade off to the amount of vehicle yaw motion needed and the allowable vehicle pitch and roll motion. The higher the elevation angle the more vehicle yaw motion required and less vehicle pitch and roll allowed because of the amount of azimuth (outer) gimbal motion needed to maintain track. For elevation angles below a certain amount (e.g., 63 degrees) the amount of vehicle yaw motion can approach down to +/−10 degrees. in certain situations, the vehicle yaw motion can be 0.01 degrees and the unknowns estimated with very small error.

As another example of the wide variations, the system can be configured to allow usage of host vehicle's INS, thereby reducing system procurement cost significantly.

As yet another example of the wide variations of the systems and methods disclosed herein, it should be understood that the steps and the order of the steps in the processing flows described herein may be altered, modified, removed and/or augmented and still achieve the desired outcome. As an illustration, a multiprocessing or multitasking environment could allow two or more steps to be executed concurrently.

Additionally, the systems' and methods' data (e.g., associations, mappings, data input, data output, intermediate data results, final data results, etc.) may be stored and implemented in one or more different types of computer-implemented data stores, such as different types of storage devices (e.g., memory) and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

Still further, the systems and methods may be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

What is claimed is:

1. A method for alignment calibration of an RF antenna in satellite communications, comprising:
   receiving, using one or more data processors, data representative of inertial navigation system and gimbal angle measurement signals;
   wherein the received data is collected while a vehicle is operated in a reduced yaw motion and while the RF antenna is tracking a satellite;

using, by the one or more data processors, equations that describe a mathematical relationship among the misalignments, offsets, and latency mismatch to the antenna gimbal control servo measurements;

generating estimates, by the one or more data processors, of the alignment angle errors among the inertial navigation system and the antenna gimbal base, antenna gimbal angle measurement offsets, and latency mismatch between the gimbal angle command path and the gimbal angle measurement path based upon the equations;

wherein the generated estimates are provided for pointing the RF antenna, wherein the generated estimates mitigate misalignment errors.

2. The method of claim 1, wherein the generated estimates are provided for an open loop pointing solution for the RF antenna.

3. The method of claim 1, wherein a first pass using the equations is performed for the calibration algorithm;
wherein while the vehicle yaws sinusoidally, using the results of the first pass for generating the second pass results by the iterative calibration solution.

4. The method of claim 3, wherein the using of the results of the first pass improves the ability during high uplook angles with the outer azimuth/inner elevation gimbal configuration to converge.

5. The method of claim 3, wherein the iterative solution of the equations results in a reduction of vehicle yaw motion needed to obtain the estimates.

6. The method of claim 5, wherein yaw displacement of plus or minus 0.01 degrees is used for the iterative solution of the equations.

7. The method of claim 5, wherein yaw displacement of plus or minus 10 degrees is used for the iterative solution of the equations.

8. The method of claim 3, wherein the iterative solution of the equations is repeated until azimuth and elevation gimbal errors satisfy a predetermined threshold during a pass.

9. The method of claim 8, wherein the predetermined threshold is set dependent on the system pointing error budget allowance.

10. The method of claim 9, wherein the system pointing error budget allowance ranges from 0.02 to 0.15 degrees depending on application requirements.

11. The method of claim 3, wherein the iterative solution of the equations results in a reduction of vehicle roll and pitch motion during the calibration.

12. The method of claim 3, wherein the iterative solution of the equations results in the estimates reducing open loop pointing errors.

13. The method of claim 3, wherein the approach involving sinusoidal motion results in pointing the RF antenna with a reduction in labor, material, and time required during an install.

14. The method of claim 3, wherein least squares approach performs the iterative solution of the equations.

15. The method of claim 3, wherein a stochastic statistic simulation validates the iterative solution of the equations.

16. The method of claim 1, wherein a track mode is used during the calibration algorithm and provides an angularly stationary antenna LOS under the vehicle while moving.

17. The method of claim 1, wherein the calibration algorithm is for alignment calibration of an RF antenna with a celestial object that is stationary during the test, wherein the celestial object is a star or moon.

18. The method of claim 1, wherein the calibration algorithm uses the host inertial navigation system; wherein the vehicle is a truck, pickup, aircraft, or ship.

19. A system for performing alignment calibration of an RF antenna in satellite communications, said system comprising:
a storage device for storing instructions for performing the alignment calibration; and
one or more data processors configured to execute the instructions to:
receive data representative of inertial navigation system and gimbal angle measurement signals;
wherein the received data is collected while a vehicle is operated in a reduced yaw motion and while the RF antenna is tracking a satellite;
use equations that describe a mathematical relationship among the misalignments, offsets, and latency mismatch to the antenna gimbal control servo measurements;
generate estimates of the alignment angle errors among the inertial navigation system and the antenna gimbal base, antenna gimbal angle measurement offsets, and latency mismatch between the gimbal angle command path and the gimbal angle measurement path;
wherein the generated estimates are provided for pointing the RF antenna;
wherein the generated estimates mitigate misalignment errors.

20. A non-transitory computer readable medium having stored there on instructions for performing alignment calibration of an RF antenna in satellite communications that, when executed, cause one or more processors:
receive data representative of inertial navigation system and gimbal angle measurement signals;
wherein the received data is collected while a vehicle is operated in a reduced yaw motion and while the RF antenna is tracking a satellite;
use equations that describe a mathematical relationship among the misalignments, offsets, and latency mismatch to the antenna gimbal control servo measurements;
generate estimates of the alignment angle errors among the inertial navigation system and the antenna gimbal base, antenna gimbal angle measurement offsets, and latency mismatch between the gimbal angle command path and the gimbal angle measurement path;
wherein the generated estimates are provided for pointing the RF antenna;
wherein the generated estimates mitigate misalignment errors.

* * * * *